(12) United States Patent
Hyde

(10) Patent No.: US 11,219,336 B2
(45) Date of Patent: Jan. 11, 2022

(54) SINK TOP ACCESSORY

(71) Applicant: Christine Hyde, Simi Valley, CA (US)

(72) Inventor: Christine Hyde, Simi Valley, CA (US)

( * ) Notice: Subject to any disclaimer, the term of this patent is extended or adjusted under 35 U.S.C. 154(b) by 0 days.

(21) Appl. No.: 16/782,590

(22) Filed: Feb. 5, 2020

(65) Prior Publication Data
US 2021/0235940 A1 Aug. 5, 2021

(51) Int. Cl.
*A47J 47/20* (2019.01)
*A47K 3/00* (2006.01)
*E03C 1/186* (2019.01)

(52) U.S. Cl.
CPC .............. *A47J 47/20* (2013.01); *A47K 3/001* (2013.01); *E03C 1/186* (2013.01)

(58) Field of Classification Search
CPC ....................................................... A47J 47/20
USPC ..................................... 4/657, 654, 658–659
See application file for complete search history.

(56) References Cited

U.S. PATENT DOCUMENTS

| | | | | |
|---|---|---|---|---|
| 1,751,536 A * | 3/1930 | Thomson | .................. | A47B 5/04 108/78 |
| 2,147,805 A * | 2/1939 | Windsor | .................. | A47K 1/06 4/655 |
| 3,300,265 A * | 1/1967 | Wilmer | .................. | A47B 63/00 312/303 |
| 3,791,314 A * | 2/1974 | Berretta | ............... | A47B 23/002 108/43 |
| 3,988,784 A * | 11/1976 | Reedy | ..................... | E03C 1/186 4/654 |
| 4,305,166 A * | 12/1981 | Rose | ....................... | E03C 1/186 4/631 |
| 4,351,073 A * | 9/1982 | Elsas | ........................ | A47K 1/06 4/654 |
| 4,519,656 A * | 5/1985 | Raz | ....................... | A47B 67/005 211/119.009 |
| 5,016,298 A * | 5/1991 | Ris | .......................... | A47J 47/20 4/654 |
| 5,106,156 A * | 4/1992 | Marquis | ................. | B60N 3/002 108/43 |
| 5,299,683 A * | 4/1994 | Poole | ..................... | A47K 3/281 132/315 |
| 5,475,880 A * | 12/1995 | Guenther | ............... | A47K 3/122 108/67 |
| 5,522,508 A * | 6/1996 | Pesola | ................. | A63F 3/00895 206/579 |
| 5,815,855 A * | 10/1998 | McKeehan | ............. | E03C 1/186 4/631 |

(Continued)

OTHER PUBLICATIONS

European Search Report from 21155387.0 dated Jun. 21, 2021, 7 pgs.

*Primary Examiner* — Lori L Baker
(74) *Attorney, Agent, or Firm* — Tutunjian & Bitetto, P.C.

(57) ABSTRACT

An accessory item for a sink top is configured to increase the working surface area surrounding the sink. The sink top accessory includes multiple panels preferably made from silicone rubber, each panel having a rigid integrated frame structure. The panels are connected to each other using living hinges, which enable the accessory to be folded for storage. In use, the sink top accessory sits over the sink without obstructing use of the sink faucet, and operates to turn a large portion of the sink into usable work space by operating to extend the counter area around the sink into the sink, thus increasing the working surface area of the same.

27 Claims, 10 Drawing Sheets

(56) References Cited

U.S. PATENT DOCUMENTS

| | | | | |
|---|---|---|---|---|
| 5,833,330 A * | 11/1998 | Kos | A61B 50/10 | 312/209 |
| 5,884,889 A * | 3/1999 | Crosby | A47B 23/04 | 248/460 |
| 5,984,092 A * | 11/1999 | Heard-Willmon | A45C 13/02 | 206/232 |
| 6,109,442 A * | 8/2000 | Roegner | A45C 11/00 | 150/106 |
| 6,182,305 B1 * | 2/2001 | O'Connell | A47B 77/02 | 269/289 R |
| 6,223,754 B1 * | 5/2001 | Burdi | A45D 33/006 | 132/295 |
| 6,502,570 B2 * | 1/2003 | Grady | F24C 15/12 | 126/37 A |
| 6,568,009 B2 * | 5/2003 | Linger | A61G 1/013 | 128/870 |
| 6,640,813 B2 * | 11/2003 | Raisner | A45C 11/008 | 132/200 |
| 6,918,147 B2 * | 7/2005 | Stackman | A47D 5/006 | 4/551 |
| 7,086,099 B2 * | 8/2006 | Rocci | E03C 1/186 | 4/656 |
| 7,363,936 B1 * | 4/2008 | Simoneaux | B65D 25/06 | 137/312 |
| 7,685,654 B1 * | 3/2010 | Jones | A47K 1/06 | 4/655 |
| 7,950,337 B2 * | 5/2011 | Chen | A47C 17/70 | 108/115 |
| 8,727,653 B2 * | 5/2014 | Nelson | A45C 7/0054 | 402/79 |
| 9,032,567 B1 * | 5/2015 | Galgano | E03C 1/186 | 4/657 |
| 9,232,862 B1 * | 1/2016 | Arch | A47D 5/006 | |
| 9,493,934 B2 * | 11/2016 | Clayton | E03C 1/186 | |
| 9,915,057 B2 * | 3/2018 | Williams | E03C 1/186 | |
| 10,058,218 B2 * | 8/2018 | Purvis | A45D 44/16 | |
| 10,299,634 B2 * | 5/2019 | Reyes | A47K 1/06 | |
| 2004/0211003 A1 * | 10/2004 | Stackman | A47D 5/006 | 5/655 |
| 2005/0172397 A1 * | 8/2005 | Jones | A47K 1/06 | 4/655 |
| 2006/0249642 A1 * | 11/2006 | Mavis | A47B 3/002 | 248/346.3 |
| 2006/0254472 A1 * | 11/2006 | Goldberg | A47B 23/001 | 108/50.11 |
| 2008/0173246 A1 * | 7/2008 | Barkdoll | A01K 7/00 | 119/74 |
| 2010/0132111 A1 * | 6/2010 | Na | A47L 15/14 | 4/625 |
| 2011/0219535 A1 * | 9/2011 | Bouroullec | A47K 1/04 | 4/654 |
| 2012/0167294 A1 * | 7/2012 | Ben-Menachem | E03C 1/186 | 4/286 |
| 2013/0098276 A1 * | 4/2013 | Trinko | A47C 17/46 | 108/33 |
| 2014/0137321 A1 * | 5/2014 | Clayton | E03C 1/186 | 4/654 |
| 2015/0296953 A1 * | 10/2015 | Murdock | A61K 8/42 | 132/203 |
| 2016/0101227 A1 * | 4/2016 | Norris | A61M 1/3656 | 604/29 |
| 2016/0235572 A1 * | 8/2016 | Ingvarsson | A61F 5/012 | |

* cited by examiner

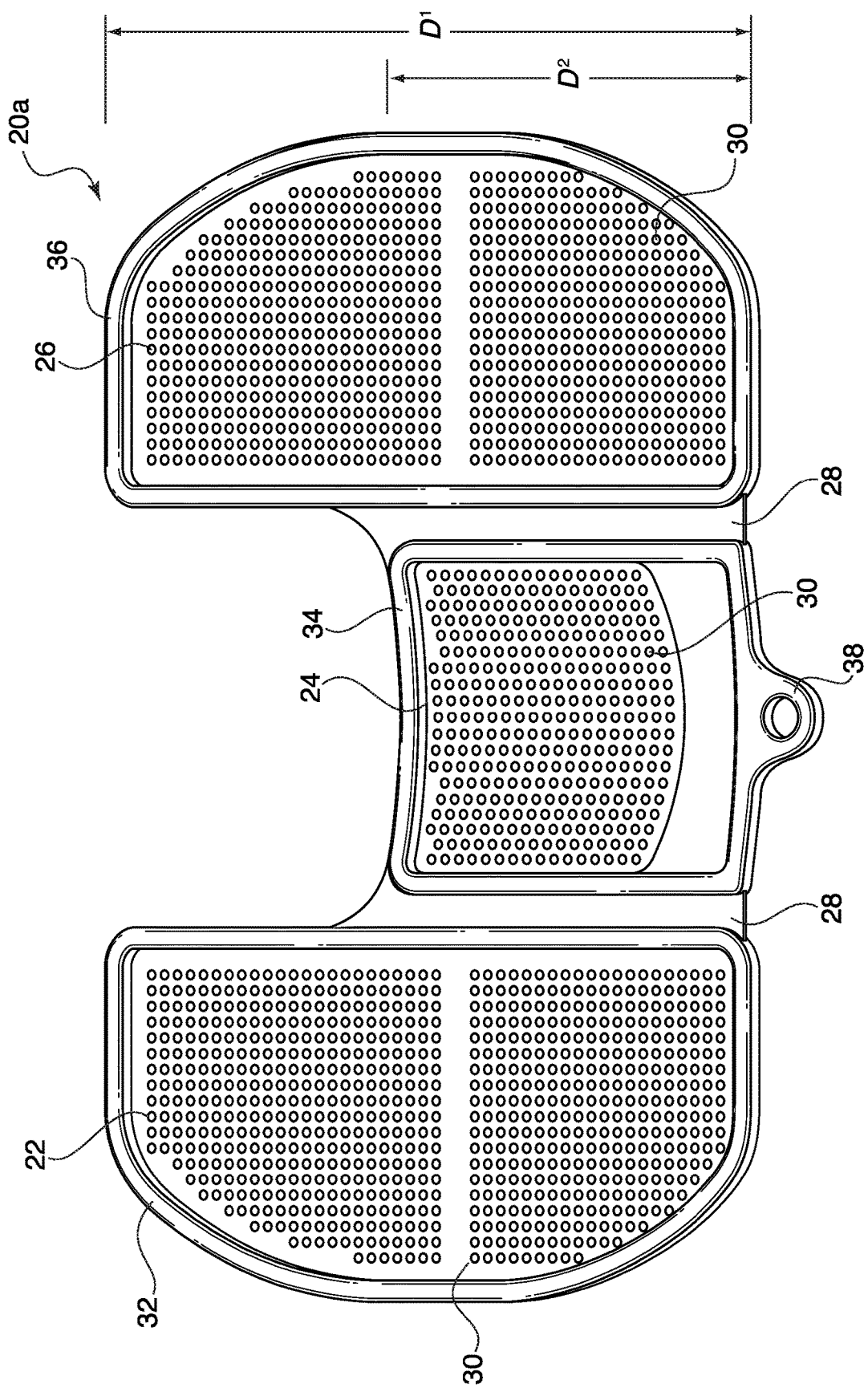

SINK TOP ACCESSORY

BACKGROUND

The present invention relates to sinks. More particularly, it relates a device configured to increase the surface area of a sink top to assist a user in placement of their personal items when using the sink.

Bathroom and kitchen sinks come in many different sizes. More importantly, the counter areas surrounding these sinks are crucial workspace for the user. For example, in a bathroom environment, the sink may be a pedestal sink for decorative purposes (which has no counter space at all around the same), or the sink could be part of a small vanity where the counter space around the sink is very limited. In these instances, the individual using the sink to get ready (e.g., put makeup on, do their hair, shave, etc.) often places their products on the counter surrounding the sink. It thus becomes apparent that when the counter surface area is small (or non-existent in the case of a pedestal sink) the user very quickly finds themselves without sufficient space for their stuff, to the point where the sink itself is used to hold a brush, hairdryer or other multiple items.

In a kitchen environment, the sink may not have large amounts of counter space around the same (e.g., small apartments, studios or small homes with smaller kitchens). As such, with smaller counter areas around the sink, the use of the same can sometimes be more difficult. For example, the user is cleaning dishes and utensils, and doesn't have sufficient counter space to hold the dishes or utensils before drying.

It is therefore an aspect of the present invention to provide an easy to use, easy to store device that allows a user to increase the surface area of the space around the sink and turn the sink itself into usable counter like surface area.

SUMMARY

According to an implementation, the sink top accessory includes a first panel, a second panel, and a center panel. The center panel has one side connected to the first panel via a living hinge, and an opposing side connected to the second panel via a living hinge. The center panel being a different size relative to the first and second panels.

According to another implementation, the sink top accessory includes two outer panels and a center panel. The two outer panels each have a predetermined depth, and the center panel has a depth smaller than the predetermined depth of the two outer panels. The center panel being connected to the two outer panels using living hinges.

According to yet another implementation, the sink top accessory includes a center panel having opposing sides, an integrated frame of a rigid material and a first depth. A first outer panel is connected to one of the sides of the center panel via a living hinge and has an integrated frame of a rigid material and a second depth. A second outer panel is connected to the other of the sides of the center panel via a living hinge and has an integrated frame of a rigid material, and a depth equal to the second depth of the first outer panel. The first depth is smaller than the second depth such that the center panel does not interfere with operation of a sink faucet when the sink top accessory is positioned over a sink.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 4 is top view of the sink top accessory according to one embodiment of the invention;

DETAILED DESCRIPTION

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor to furthering the art and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

Figure 1:
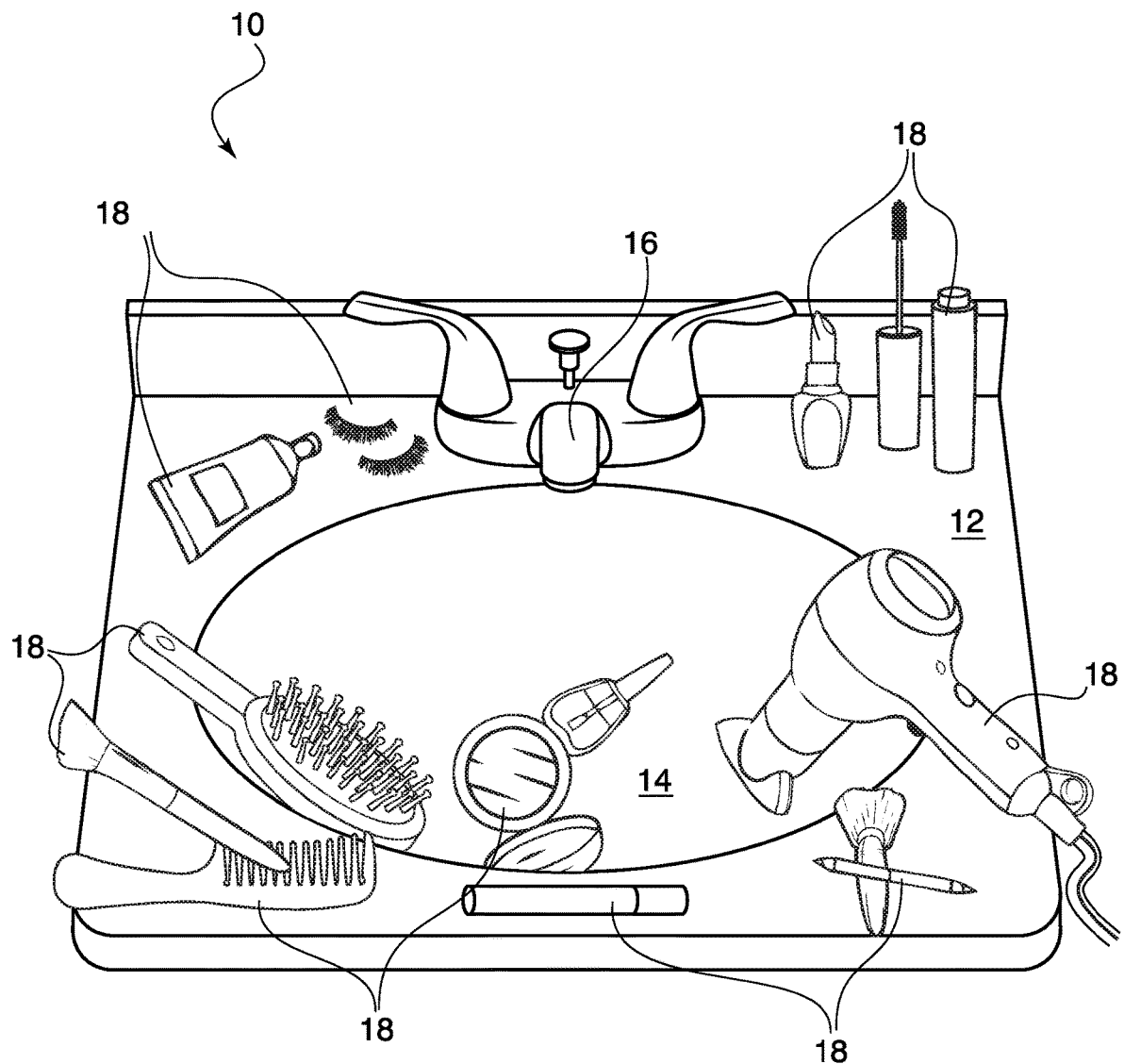
FIG. 1 is a view of a sink to which the present invention can be applied.
Figure 2A:
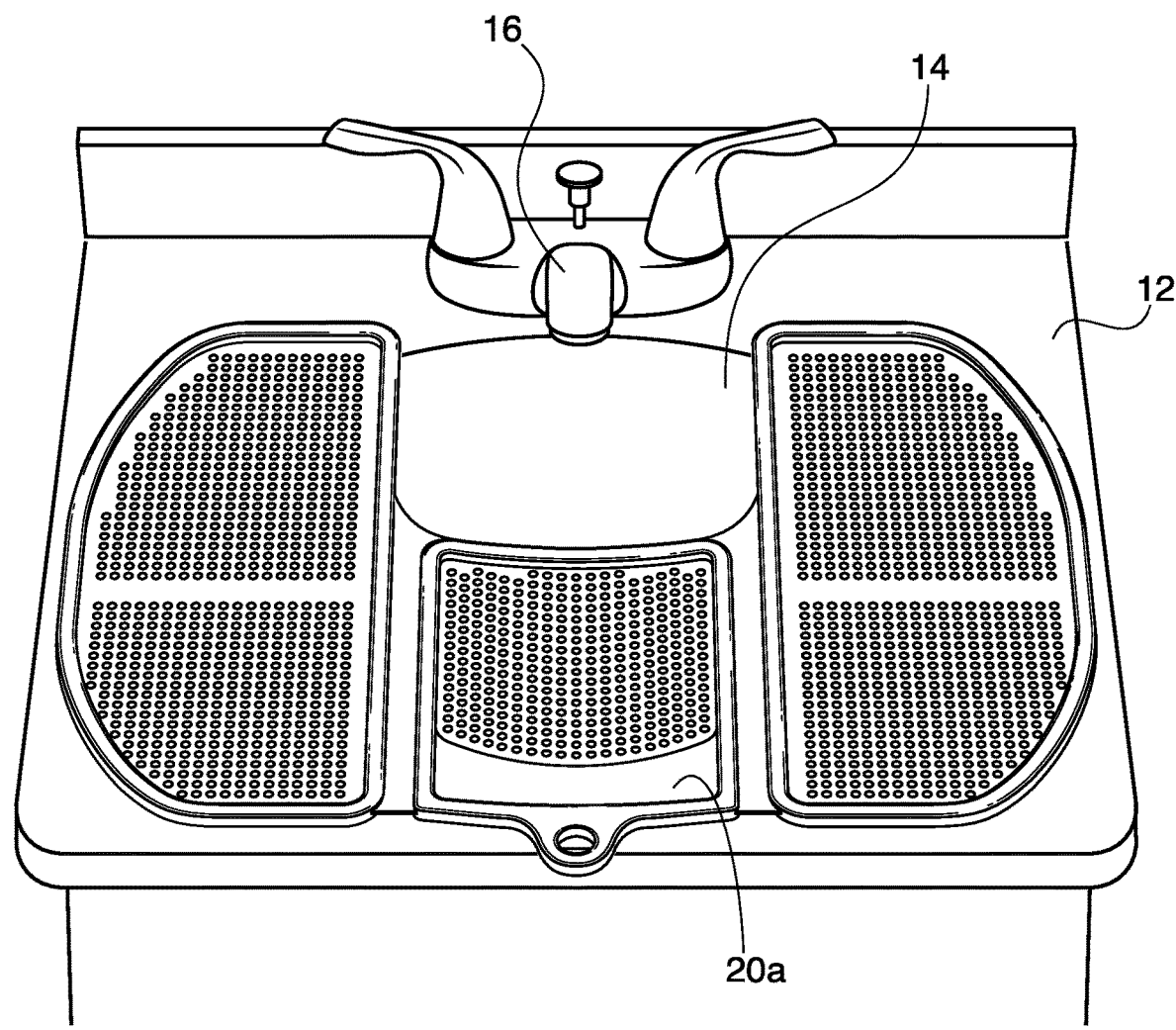
FIG. 2A is a view of the sink of FIG. 1 showing the sink top accessory positioned over the same in accordance with one embodiment of the invention.
Figure 2B:
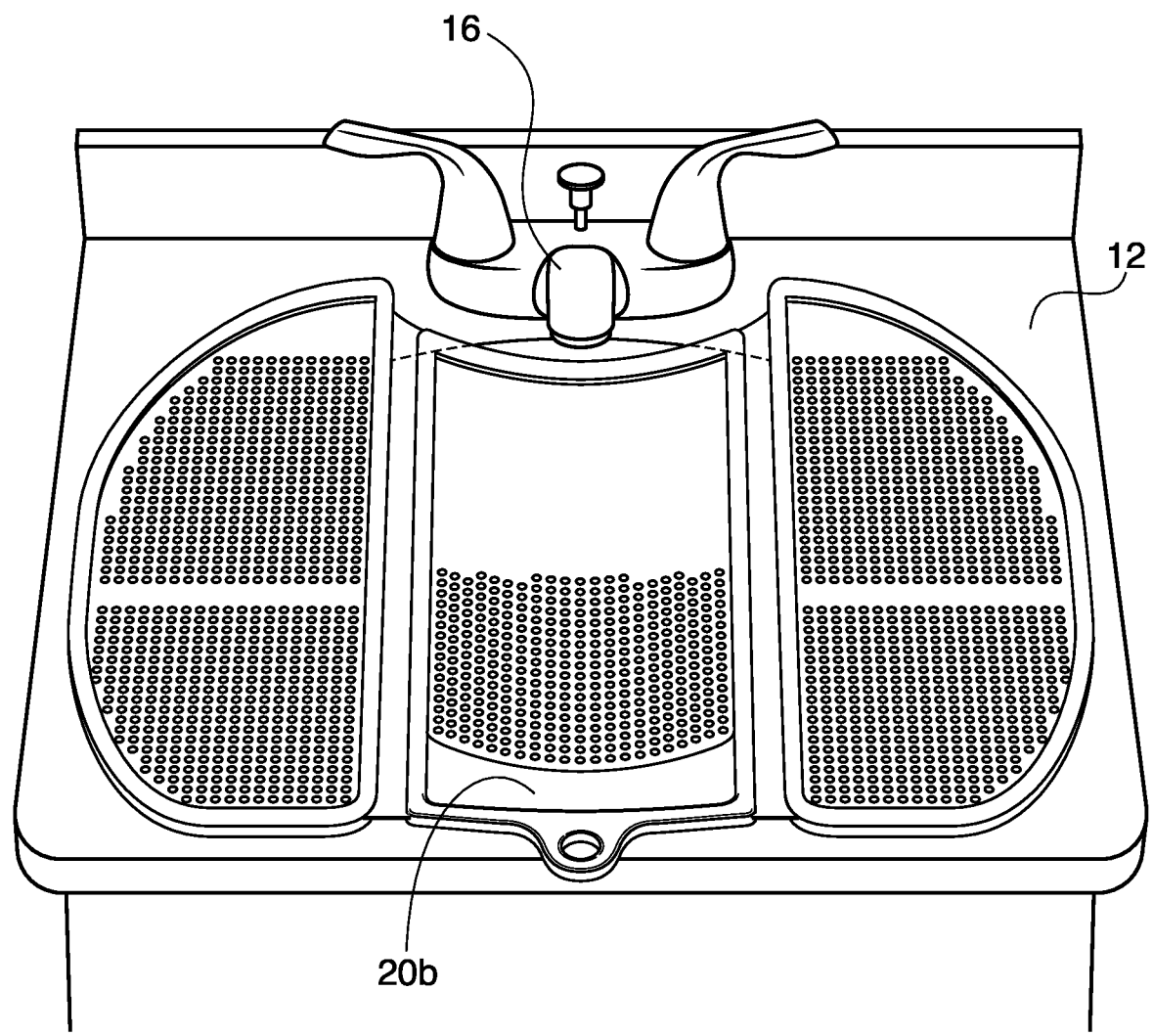
FIG. 2B is a view of the sink if FIG. 1 showing an alternative embodiment of the sink top accessory positioned over the same.
Figure 3:
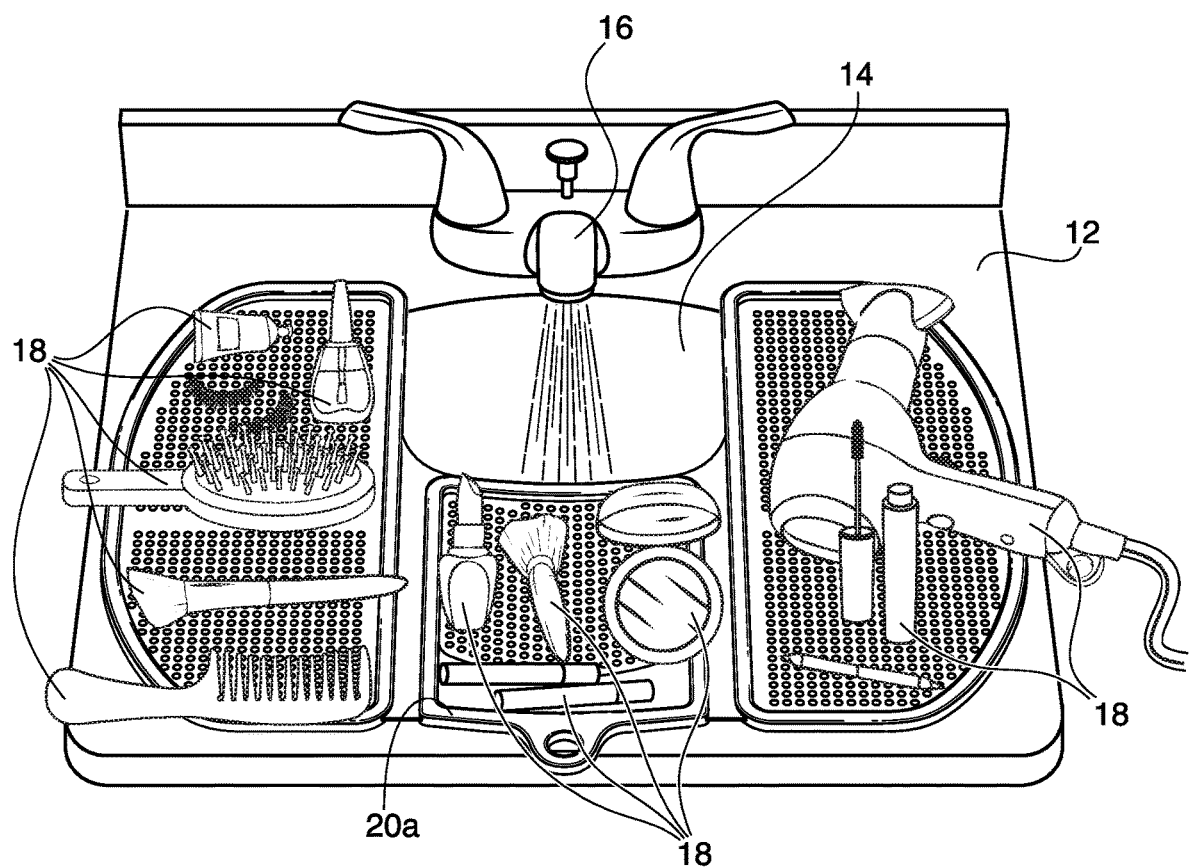
FIG. 3 is a view of the sink of FIG. 2 showing the sink top accessory in use according to one embodiment of the invention.
Figure 6:
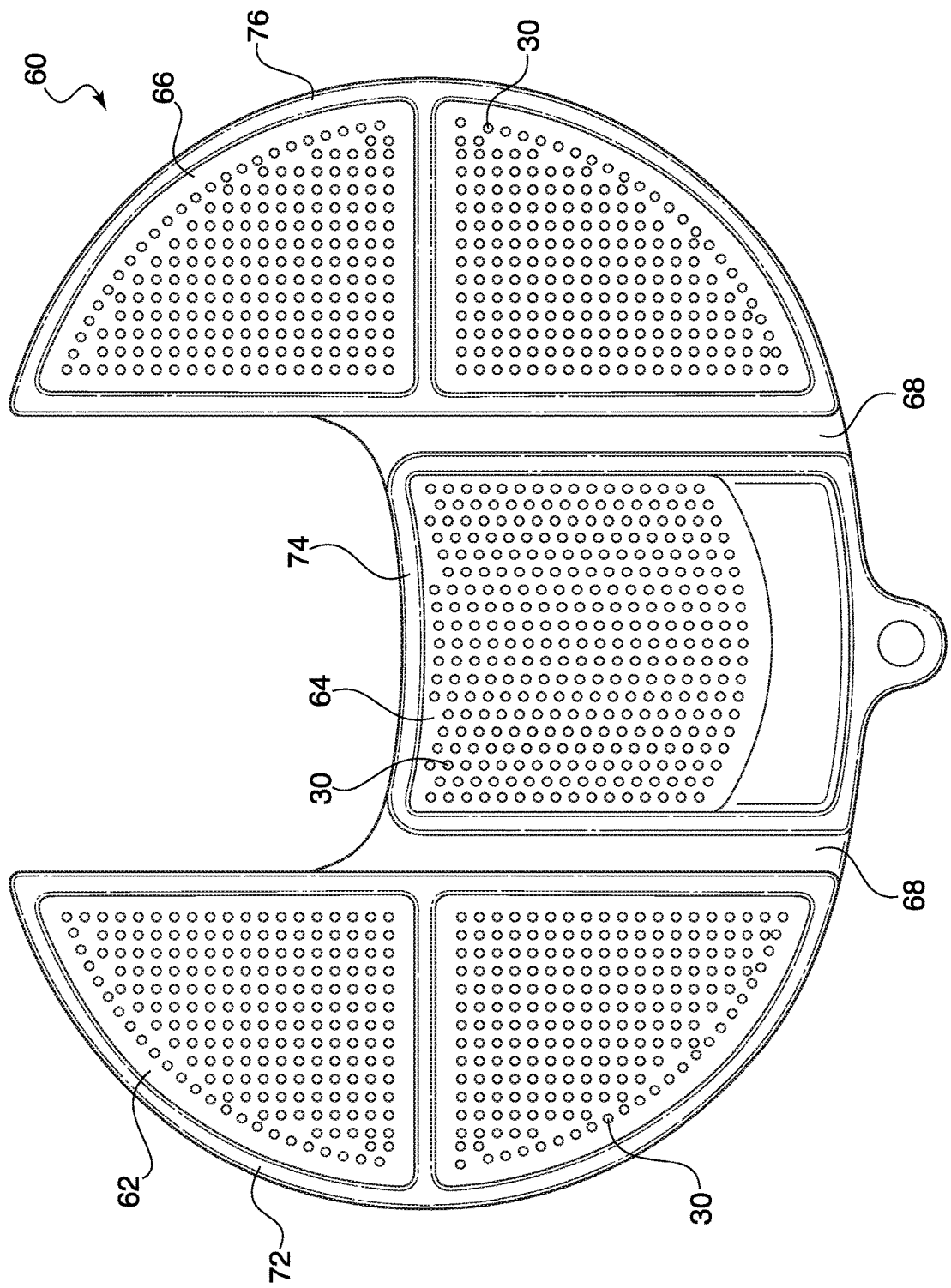
FIG. 6 is a top view of the sink top accessory according to a further embodiment of the invention.
Figure 7:
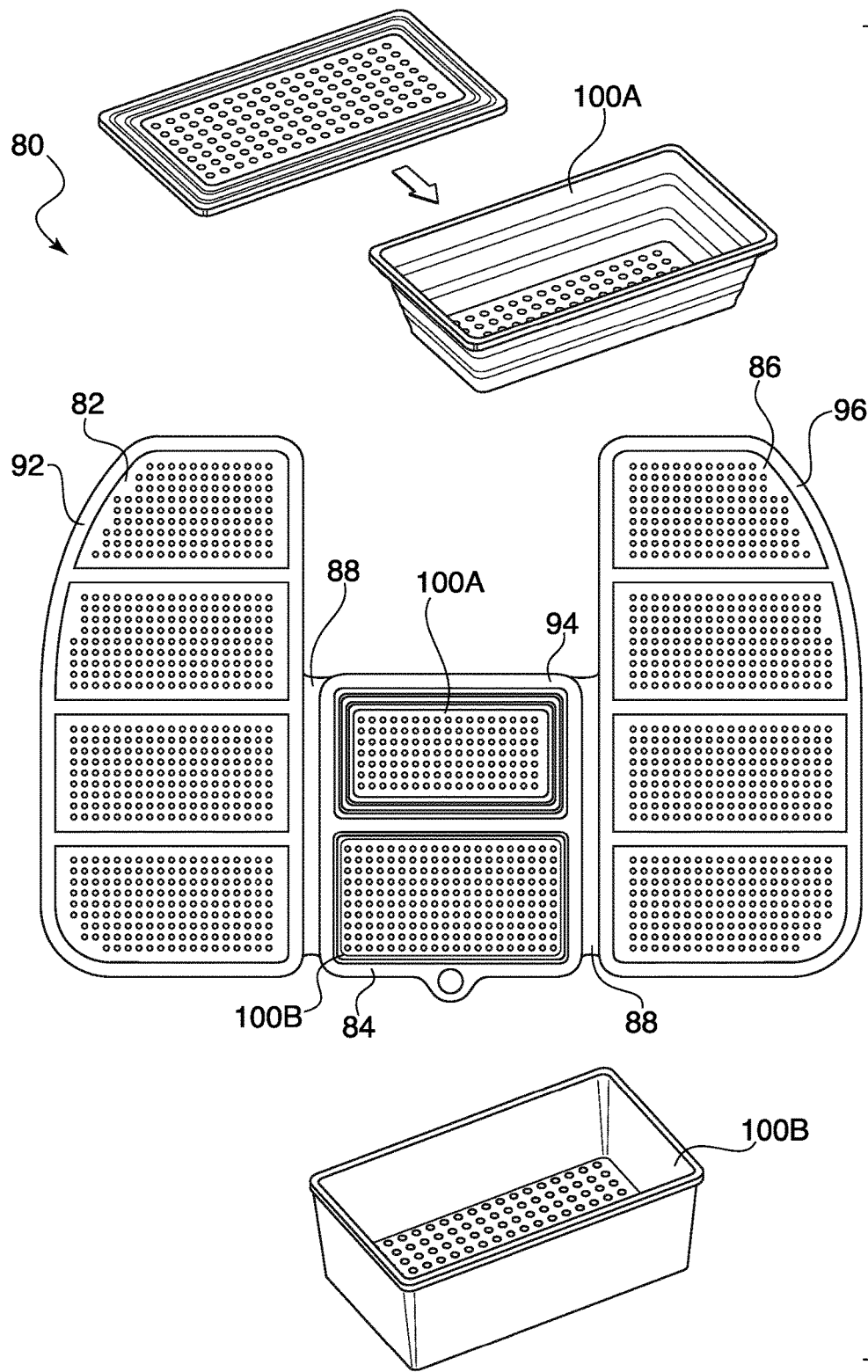
FIG. 7 is a plan view of yet another embodiment of the sink top accessory according to the invention.

FIGS. 1-3 will show one preferred application of the sink accessory according to the invention. FIGS. 4-5 will describe the details of the sink accessory and various configurations and implementations of the same, and FIG. 6 and FIG. 7 show yet other embodiments of the sink top accessory having additional features for different applications.

Referring to FIG. 1, there is shown a sink generally identified as 10 having a countertop 12, a sink 14 and a faucet 16. The countertop 12 surrounding the sink 14 is not large, and as such, the plurality of items 18 that a user may use to get ready are positioned around the sink on the small countertop. From this image it is apparent that the countertop 12 does not have enough surface area to accommodate the user's things that they need to have at their disposal as they prepare for whatever it is they are preparing for.

FIG. 2A shows the sink top accessory 20A positioned on the countertop 12 such that a large portion of the accessory 20A is positioned over the sink 14, yet supported by countertop 12 at the periphery thereof, with the exception of an area under the faucet 16 that is left open to allow continued use of the faucet as needed when the accessory 20A is positioned as shown. FIG. 2B shows another embodiment of the sink top accessory 20B according to the invention. In this embodiment, the center panel (discussed in more detail below) is such that the faucet 16 may not be used without potentially getting water on the sink top accessory 20B.

FIG. 3 shows the sink top accessory 20A in place, with the user's items 18 organized and positioned on top thereof such that the user no longer needs to be concerned about things falling in the sink from the countertop 12 or falling off the countertop 14 onto the floor.

FIG. 4 shows one embodiment of the sink top accessory 20A according the present invention. Initially, the applicant notes that the shape of the accessory can be modified to accommodate different size or shaped sinks. Generally, the sink top accessory 20A has a shortened U-shape style with two larger side portions 22 and 26 which are both connected to a smaller center portion 24. The shape shown in this exemplary embodiment can be used on oval, rectangular and even some larger round sink styles. Additionally, the sink top accessory is preferably made from a silicone rubber material over-molded onto rigid frame members (discussed later), such that the silicone rubber provides a non-slip surface, and additionally can withstand very high levels of heat which could be generated by, for example, a curling iron, or a hair dryer.

In the preferred implementation, the silicone rubber is food grade methyl vinyl silicone rubber, HTV (high temperature vulcanizing). In other embodiments, other materials could be used, such as for example, polyesters, silicone based textiles, carbon fiber, kevlar or the like. Ideally the material chosen should be flexible and capable of withstanding high heat. However, more rigid materials such as plastics or a polyvinylchloride (PVC), could be used, however such materials may require the use of a different hinge structure compared to that of the living hinge.

As shown, and according to one implementation, the sink top accessory 20A or 20B is generally formed from silicone rubber having three (3) panels, two outer panels, 22 and 26 that are each connected to a center panel 24 by living hinges 28. The living hinges 28 are preferred and enable the folding of the accessory while maintaining material consistency between panels and hinges.

Each of the three panels, 22, 24, and 26 have outer frames 32, 34 and 36, respectively, which include internal rigid frame members made of, for example, a metal such as steel, stainless steel or aluminum. In an alternative embodiment, the rigid internal frame members could be made of a different material so long as it exhibits sufficient rigidity and is capable of withstanding the heat of the over-molding process of the silicone rubber. In a preferred implementation, stainless steel 201 or mild carbon steel are the desired frame material for the outer frame members. In other implementations/embodiments, the frame could be made of plastics, In accordance with one preferred implementation, the outer panels 22 and 26 have a shape and are configured around the center panel 24 such that one outer panel 22 is a mirror image of the other outer panel 26 about the center panel 24.

Referring to both FIGS. 3 and 4, the center panel 24 has a depth measurement D2 that is specifically configured to be smaller than the depth measurement D1 of outer panels 22 and 26 such that the accessory has an overall U-shape appearance, but more importantly, while the outer panels 22, 26 and the front of the center panel 24 support the sink top accessory 20A on the sink top surface, the sink faucet 16 can still be used while the same is in place and in use as shown in FIG. 3. As shown in FIG. 4, the measurement D1 of the outer panels is generally large enough to span the depth of a sink opening such that the outer panels rest outside the periphery of the sink opening (in the countertop) to support the sink accessory across the same. The center panel preferably has a depth D2 that is smaller than measurement D1 of the outer panels. As shown in FIG. 2B, the depth of the center panel is only slight less than that of the outer panels. However, it is contemplated that in other alternative embodiments, the depth of the outer and center panels could be the same depending on a desired application or implementation.

The folding and thereby storage capability of the sink top accessory 20A is a desired feature of the same. As such, in one preferred implementation, the center panel 24 is configured to have a width to be larger than that of the outer panels so that the outer panels 22, 26 are folded inward over the center panel 24 and the folded product is neat and maintains a consistent form. According to one implementation, the side or outer panels 22, 26 have a width that is in a range of 80-95% of the width of the center panel 24.

Figure 5B:
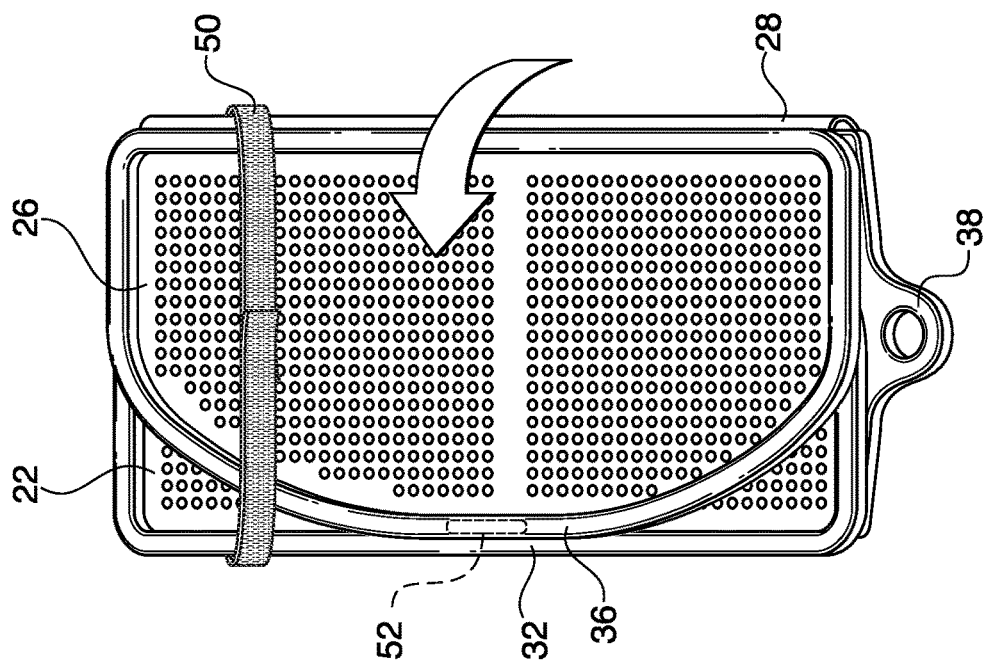
FIGS. 5A and 5B show the folding/storage of the sink top accessory according to one embodiment of the invention.
Figure 5A:
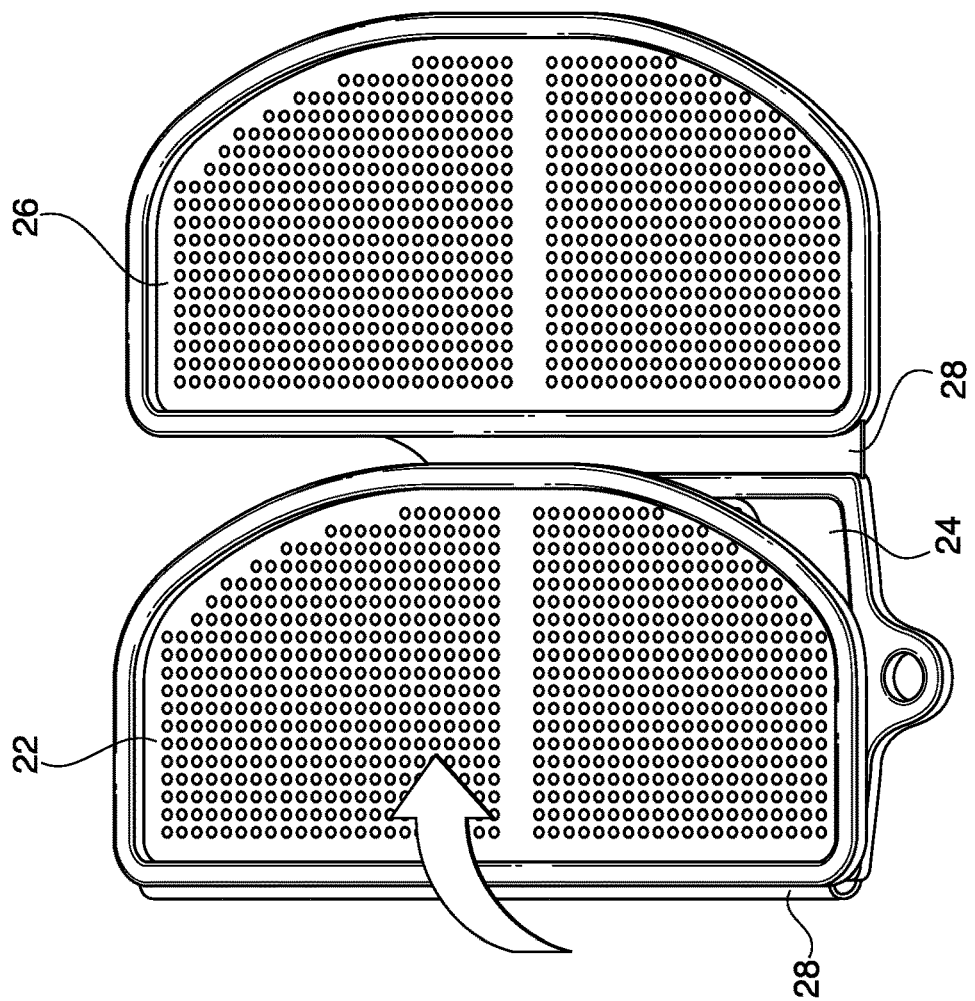

Referring to FIGS. 5A and 5B, the folding and storage capability of the sink top accessory 20A is shown. Through the implementation of the living hinges 28 and the different widths of the outer panels 22, 26 compared to the center panel 24 discussed above, one panel 22 can be folded over the center panel 24, and then the other panel 26 can be folded over panel 22. When folded as shown, the size of the sink top accessory 20A is reduced to approximately ⅓ it unfolded size. In one embodiment a releasable strap 50 can be used to hold the accessory in its folded position for storage. The strap 50 can be any suitable known type of material and can use a hook and loop type fastener or any other type of adjustable strap device to selectively secure and release the same around the folded sink top accessory 20A. A hole 38 can be provided as shown which can be used to hang the sink top accessory on a hook when not in use. Once folded, the accessory 20A can be stored anywhere of the user's choice without taking up much space.

In another embodiment, a magnet 52 can be positioned inside the silicone rubber frame 36 so as to allow that magnet to attract to the metal inside the frame 32 and hold the accessory 20 in the folded configuration. In other embodiments, magnets 52 can be provided in both frames 36 and 32 and positioned so as to be attracted to each other when placed in the folded configuration shown in FIG. 5B. Thus, a magnetic closure system is also contemplated.

Referring to FIG. 6, there is shown the sink top accessory 60 according another embodiment of the invention. This overall three panel (62, 64, 66) configuration is maintained in this embodiment, where the overall shape of the accessory 60 is more rounded than the other disclosed embodiments. The three panels are connected to each other via living hinges 68 and will operate as described above with respect to the embodiment of FIGS. 5A and 5B. Each of the three panels, 62, 64, and 66 have outer frames 72, 74 and 76, respectively, which include internal rigid frame members made of, for example, a metal such as steel, stainless steel or aluminum. In an alternative embodiment, the rigid internal frame members could be made of a different material so long as it exhibits sufficient rigidity and is capable of withstanding the heat of the over-molding process of the silicone rubber. This embodiment is an example of how the overall shape of the sink top accessory of (20A, 20B, 60) described herein can be modified to accommodate different size sink tops, while still maintaining the inventive aspects of the invention.

The sink top accessory (20A, 20B, 60) described in the embodiments of FIGS. 2-6 are shown to include a plurality of holes 30. The holes 30 are not required for operation of the sink top accessory, however they do provide for some advantages. For example, they allow for water or any other liquid to pass through the accessory when positioned on a sink as intended. Additionally, the holes 30 operate to increase ventilation and thereby not only allow steam or vapor to pass through the device, but also helps in the drying of the same should the same get wet during use. The use of holes 30 also reduces the amount of silicone rubber required during the manufacturing process, thus not only helping to lower manufacturing costs, but also reducing the overall weight of the product.

Referring to FIG. 7 there is shown another embodiment of the sink top accessory 80 according to the invention. This embodiment is more directed toward a kitchen use of the accessory where the outer panels 82 and 86 with corresponding frames 92 and 96, respectively, are a little larger than the other disclosed embodiments. More specifically, the center panel 84, which is also connected to the outer panels via living hinges 88, can include one or more collapsible baskets 100A, or alternatively, a formed basket 100B.

In the embodiment of the rigid or formed basket 100B, the same would be configured to drop into an opening the frame 94 of the center panel 84 specifically configured to receive the same without falling through.

In one embodiment, the collapsible basket 100A would not be removable, and the sink top accessory 80 can have one or two of the same (shown in FIG. 7 with only one). During use, the user would push down on the inside of the basket to cause the same to expand downward into the sink (once the accessory is positioned thereover). When the user is finished using the sink top accessory, the basket 100A can be collapsed, thus enabling the accessory to be folded for storage.

In another embodiment, the collapsible basket 100A could be removable. Similar to the rigid basket 100B, the opening in the center panel 84 would be configured to receive the collapsible basket 100A without allowing the same to fall through the accessory.

In other contemplated embodiments of the kitchen sink top accessory 80, the baskets 100A, 100B disclosed herein or modified shaped versions of the same can be incorporated not only into the center panel 84, but also into the outer panels 82, 86. It is further envisioned that multiple different size compartments or baskets could be implemented for many different applications. to assist one in cleaning food for preparation of the same.

Figure 8:
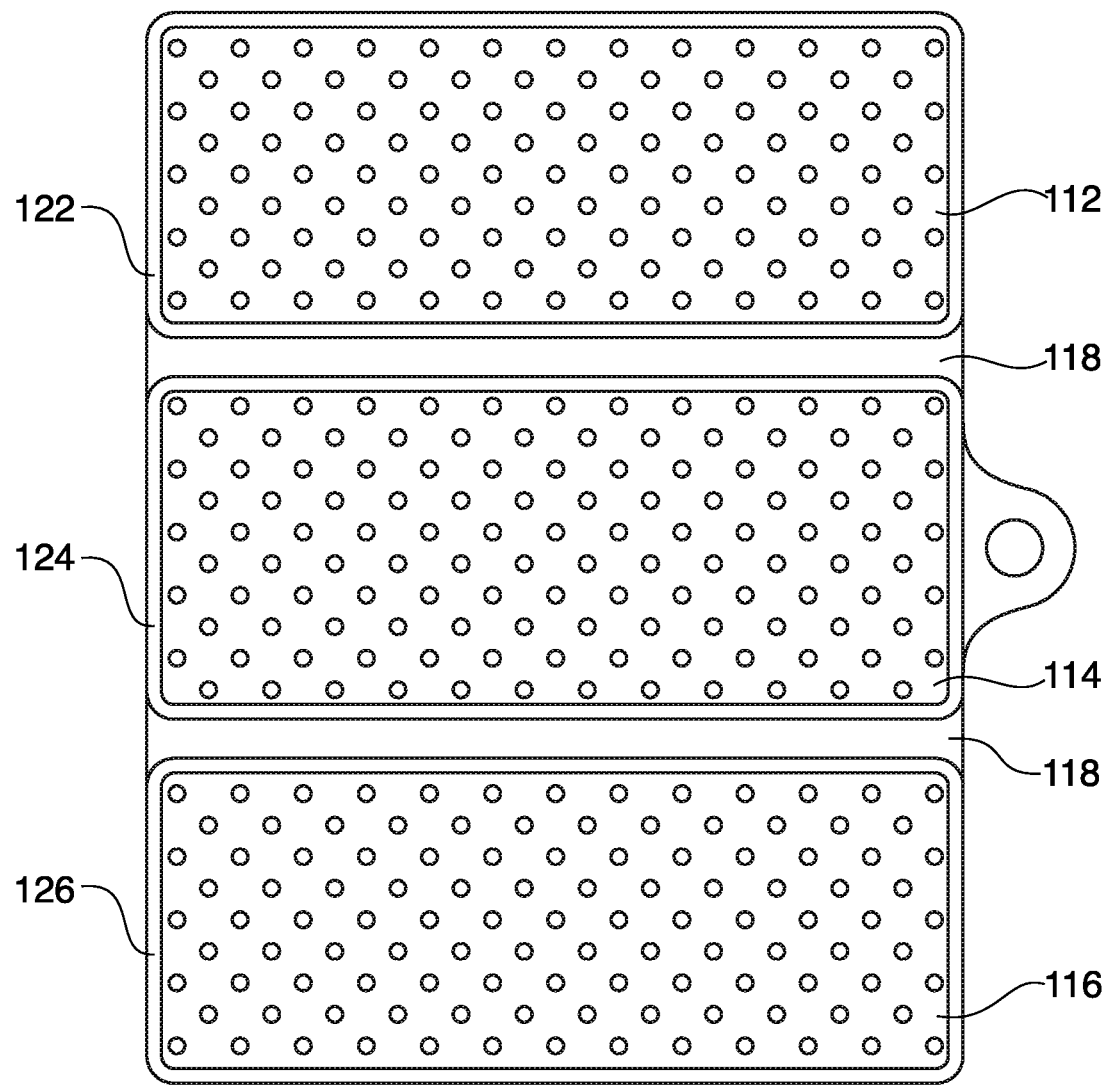
FIG. 8 is a plan view of another embodiment of the sink top accessory according to the invention.
Figure 9:
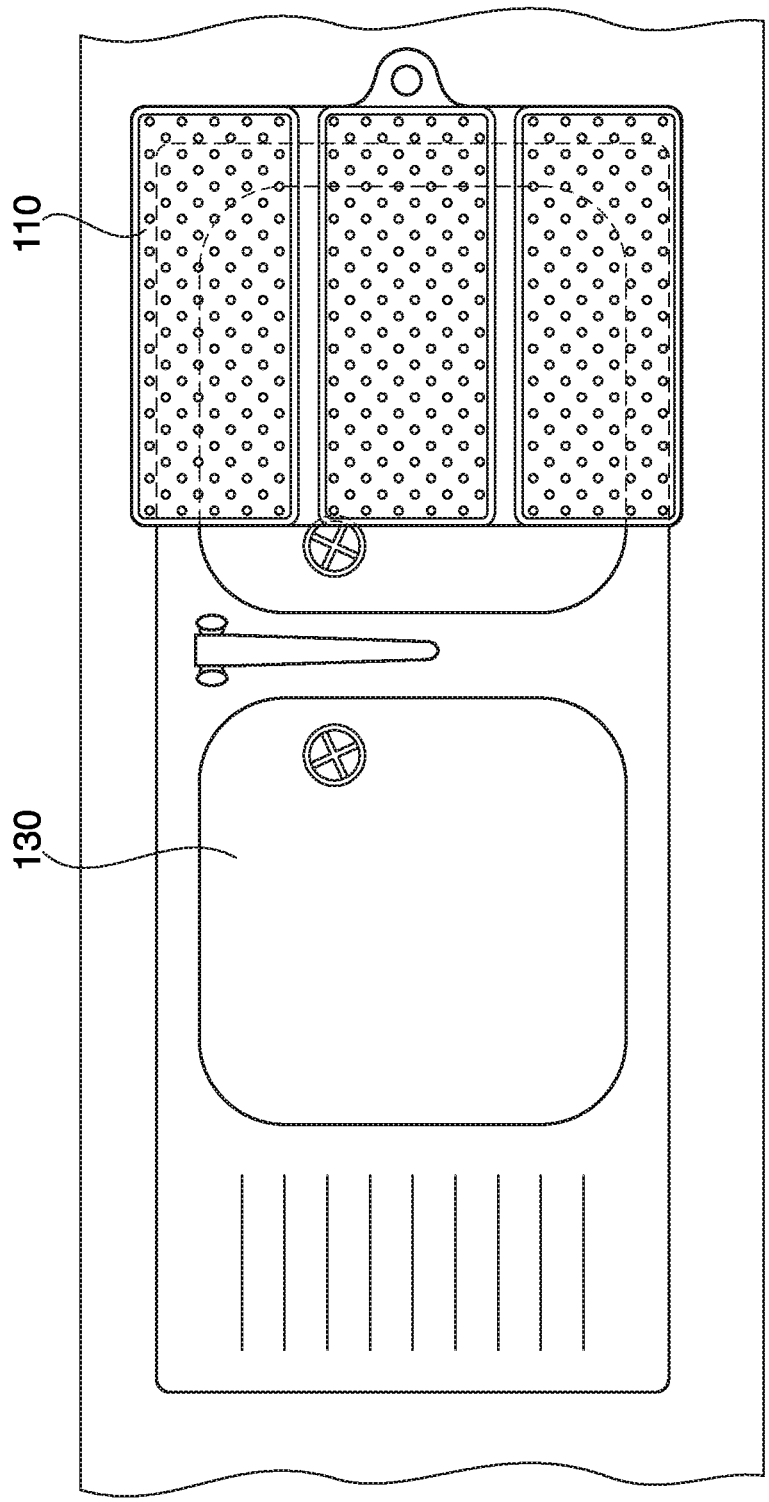
FIG. 9 is a top view of the sink top accessory of FIG. 8 in place over a kitchen sink, according to an embodiment of the invention.

According to yet further contemplated embodiments, the kitchen sink top accessory can be configured to be positioned over one side of a sink from front to back, rather than span across the same from side to side. In this embodiment, two or more substantially rectangular panels connected by hinges (preferably living hinges) can be configured to sit along the side of a sink and partially extend over that side of the sink. FIGS. 8 and 9 show an example of this sink top accessory 110 according to this embodiment. Similar to the previously discussed embodiments, panels 112, 114 and 116 are connected by living hinges 118, and each panel is reinforced with an internal frame structure 122, 124 and 126, respectively. As shown in FIG. 9, the sink top accessory 110 can be positioned partially, or fully over the sink 130, as the user determines.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Although the illustrative embodiments have been described herein with reference to the accompanying drawings, it is to be understood that the present principles are not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A sink top accessory comprising:
   two outer panels each having a predetermined depth; and
   a center panel having a depth smaller than the predetermined depth of the two outer panels, such that when the two outer panels and center panel are in an open configuration positioned over an opening of a sink the center panel does not interfere with operation of a sink faucet, the center panel being connected to the two outer panels using living hinges;
   wherein in the open configuration the two outer panels and center panel are positioned over an opening of sink to create usable counter like surface area over the sink.

2. The sink top accessory according to claim 1, wherein the two outer panels, the center panel and the living hinges are made of silicone rubber.

3. The sink top accessory of claim 2, wherein each of the two outer panels and the center panel further comprise an integrated frame made of a rigid material.

4. The sink top accessory of claim 1, further comprising a collapsible basket positioned in at least one of the center panel or one of the two outer panels.

5. The sink top accessory of claim 1, further comprising an opening in one of the panels and a basket configured to be removably secured within said opening.

6. The sink top accessory of claim 5, wherein the basket is collapsible.

7. A sink top accessory comprising:
   a center panel having opposing sides, an integrated frame of a rigid material and a first depth;
   a first outer panel connected to one of the sides of the center panel via a living hinge and having an integrated frame of a rigid material and a second depth; and
   a second outer panel connected to the other of the sides of the center panel via a living hinge and having an integrated frame of a rigid material, and a depth equal to the second depth of the first outer panel;

the first depth being smaller than the second depth such that when the first outer panel, center panel and second outer panel are in an open configuration positioned over an opening of a sink, the center panel does not interfere with operation of a sink faucet.

8. The sink top accessory of claim 7, wherein the center panel, the first outer panel and the second outer panel are made of silicone rubber over-molded onto the integrated frame, the silicone rubber forming the living hinges.

9. The sink top accessory of claim 7, further comprising a plurality of holes in at least one of the center panel, first outer panel or second outer panel.

10. The sink top accessory according to claim 8, wherein the rigid material of integrated frame comprises a metal.

11. The sink top accessory of claim 7, wherein the first outer panel is a mirror image of the second outer panel about the center panel.

12. The sink top accessory of claim 7, further comprising a removable strap configured to retain the sink top accessory in a folded configuration.

13. The sink top accessory of claim 7, further comprising a hook integrated into the center panel.

14. The sink top accessory of claim 7, further comprising at least one magnet disposed in the integrated frame of at least one of the first and second outer panels, said magnet operating to provide a magnetic closure and retain the sink top accessory in a folded configuration.

15. The sink top accessory of claim 7, further comprising an opening in one of the first, second or center panels and a basket configured to be removably secured within said opening.

16. The sink top accessory of claim 15, wherein the basket is collapsible.

17. A sink top accessory comprising:
a first panel;
a second panel; and
a center panel having one side connected to the first panel via a living hinge, and an opposing side connected to the second panel via a living hinge, the center panel being a different size relative to the first and second panels;
a basket positioned in one of the center, first or second panels;
wherein in an open configuration the first panel, the center panel and second panel are configured to be positioned over an opening of a sink to create usable counter like surface area over the sink.

18. The sink top accessory of claim 17, further comprising an opening in one of the first, second or center panels, wherein the basket is positioned within said opening.

19. The sink top accessory of claim 18, wherein the basket is collapsible.

20. The sink top accessory of claim 17, wherein each of the first and second outer panels and the center panel further comprise an integrated frame made of a rigid material.

21. The sink top accessory of claim 17, wherein the center panel, the first outer panel and the second outer panel are made of silicone rubber over-molded onto the integrated frame, the silicone rubber forming the living hinges.

22. The sink top accessory of claim 17, further comprising a plurality of holes in at least one of the center panel, first outer panel or second outer panel.

23. The sink top accessory according to claim 20, wherein the rigid material of integrated frame comprises a metal.

24. The sink top accessory of claim 17, wherein the first outer panel is a mirror image of the second outer panel about the center panel.

25. The sink top accessory of claim 17, further comprising a removable strap configured to retain the sink top accessory in a folded configuration.

26. The sink top accessory of claim 17, further comprising a hook integrated into the center panel.

27. The sink top accessory of claim 23, further comprising at least one magnet disposed in the integrated frame of at least one of the first and second outer panels, said magnet operating to provide a magnetic closure and retain the sink top accessory in a folded configuration.

* * * * *